United States Patent
Xu et al.

(10) Patent No.: US 11,496,797 B2
(45) Date of Patent: Nov. 8, 2022

(54) METHODS, SYSTEMS, AND DEVICES FOR PROVIDING AUGMENTED REALITY CONTENT BASED ON USER ENGAGEMENT

(71) Applicant: AT&T Intellectual Property I, L.P., Atlanta, GA (US)

(72) Inventors: Tan Xu, Bridgewater, NJ (US); David Crawford Gibbon, Lincroft, NJ (US); Eric Zavesky, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 131 days.

(21) Appl. No.: 16/713,287

(22) Filed: Dec. 13, 2019

(65) Prior Publication Data

US 2021/0185392 A1    Jun. 17, 2021

(51) Int. Cl.
| | |
|---|---|
| *H04N 7/10* | (2006.01) |
| *H04N 7/025* | (2006.01) |
| *H04N 21/44* | (2011.01) |
| *G06T 11/00* | (2006.01) |
| *G06F 3/04815* | (2022.01) |
| *H04N 21/81* | (2011.01) |
| *G06F 3/04845* | (2022.01) |
| *G06V 10/22* | (2022.01) |
| *G06V 20/40* | (2022.01) |

(52) U.S. Cl.
CPC ... *H04N 21/44016* (2013.01); *G06F 3/04815* (2013.01); *G06F 3/04845* (2013.01); *G06T 11/00* (2013.01); *G06V 10/235* (2022.01); *G06V 20/40* (2022.01); *H04N 21/812* (2013.01); *H04N 21/8146* (2013.01); *G06T 2200/24* (2013.01)

(58) Field of Classification Search
CPC ......... H04N 21/44016; H04N 21/4728; H04N 21/4722; H04N 21/4788; H04N 21/812; H04N 21/8146; G06F 3/04815; G06F 3/04845; G06K 9/00711; G06K 9/2081
See application file for complete search history.

(56) References Cited

U.S. PATENT DOCUMENTS

| | | | |
|---|---|---|---|
| 2011/0202603 A1* | 8/2011 | Mate | H04N 21/4316 709/205 |
| 2014/0195675 A1* | 7/2014 | Silver | H04L 65/607 709/224 |
| 2015/0358614 A1* | 12/2015 | Jin | G06F 3/03545 348/49 |

(Continued)

*Primary Examiner* — Gigi L Dubasky
(74) *Attorney, Agent, or Firm* — Guntin & Gust, PLC; Atanu Das

(57) ABSTRACT

Aspects of the subject disclosure may include, for example, embodiments that include receiving video content over a communication network, and determining a point of interest in relation to a presentation of the video content via equipment utilized by a user. Further embodiments can include identifying an object in the video content according to the point of interest, and obtaining information associated with the object. Additional embodiments can include generating first augmented reality content based on the video content and the information associated with the object, and providing the first augmented reality content to a communication device. The communication device presents the first augmented reality content. Other embodiments are disclosed.

20 Claims, 10 Drawing Sheets

(56) References Cited

U.S. PATENT DOCUMENTS

| | | | |
|---|---|---|---|
| 2016/0379410 A1* | 12/2016 | Sharma | H04N 21/4316 345/633 |
| 2017/0061694 A1* | 3/2017 | Giraldi | H04N 5/23229 |
| 2018/0158242 A1* | 6/2018 | Sugawara | G06F 3/011 |
| 2019/0080175 A1* | 3/2019 | Buratti | G06K 9/2081 |
| 2019/0196576 A1* | 6/2019 | Saarinen | G06F 3/013 |
| 2020/0051338 A1* | 2/2020 | Zia | G06F 9/451 |
| 2020/0073520 A1* | 3/2020 | Mohan | H04N 5/232 |
| 2020/0168177 A1* | 5/2020 | Lee | G06T 7/73 |
| 2020/0298113 A1* | 9/2020 | Smithers | A63F 13/86 |
| 2020/0334613 A1 | 10/2020 | Palazzo et al. | |

* cited by examiner

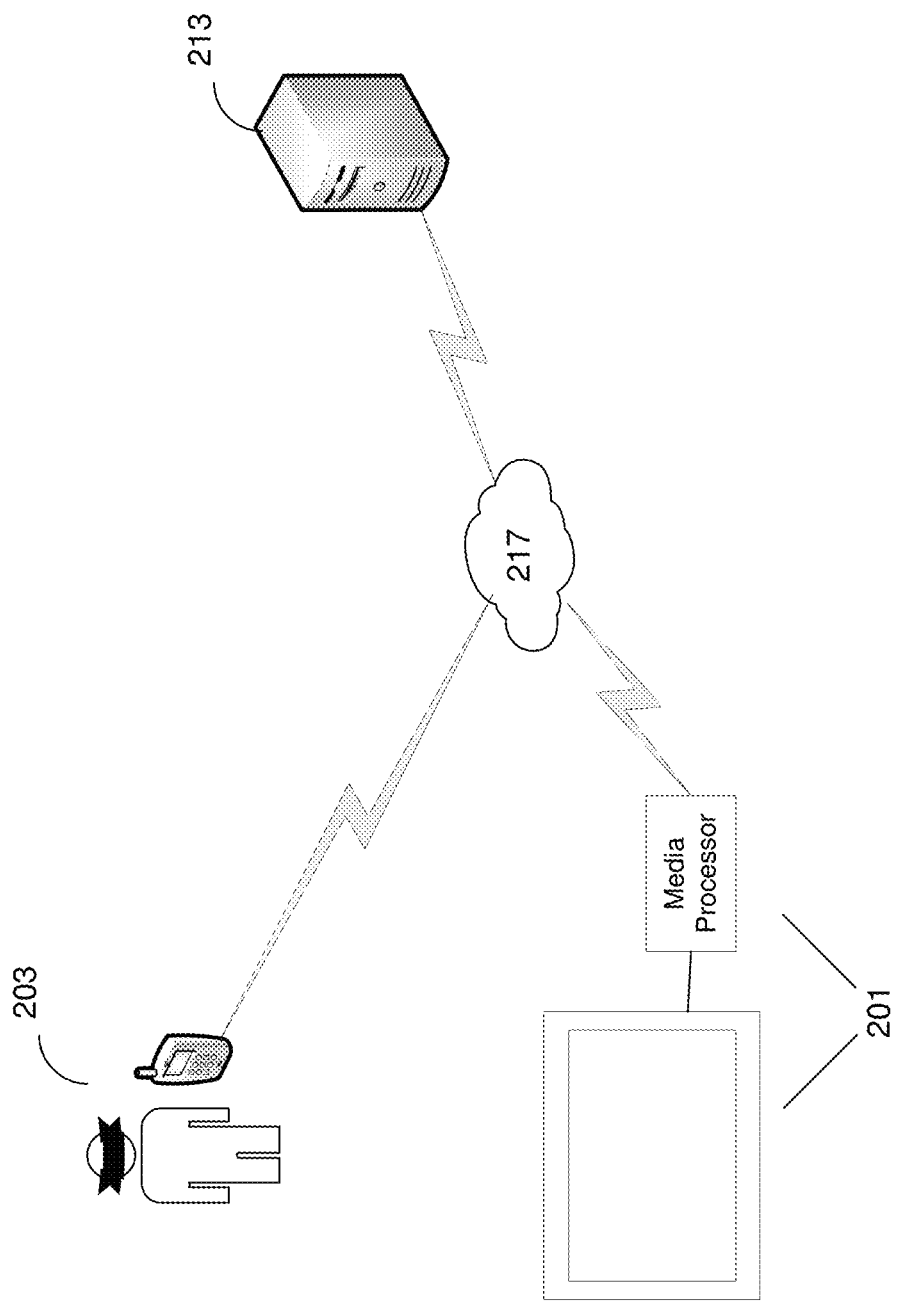

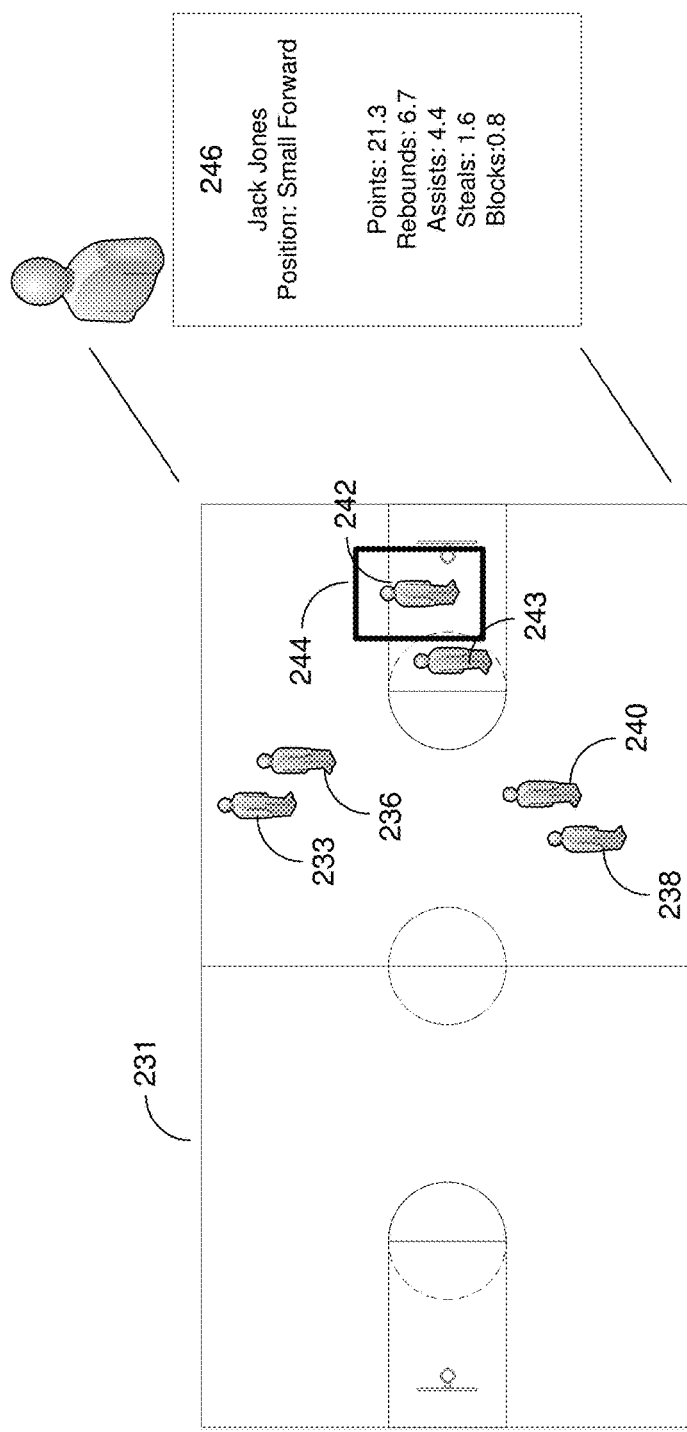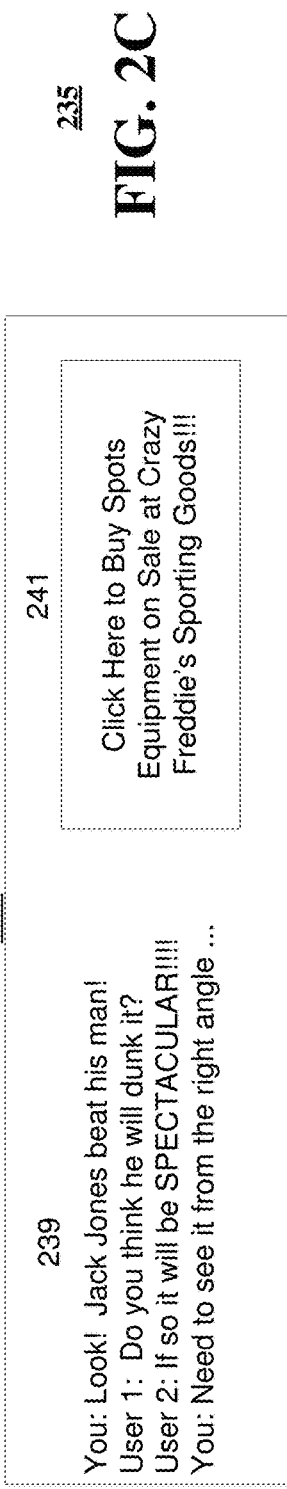
FIG. 2C

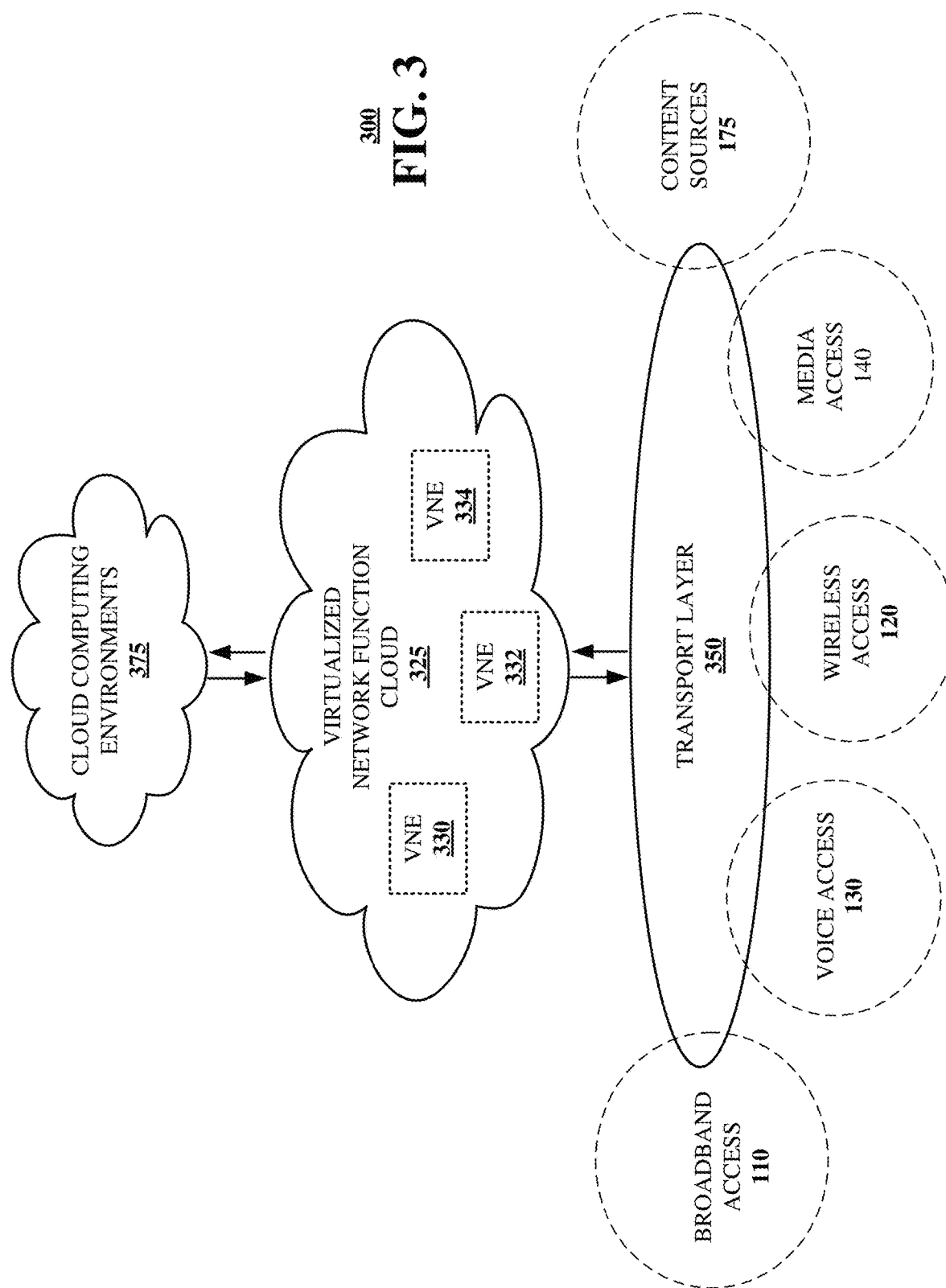

METHODS, SYSTEMS, AND DEVICES FOR PROVIDING AUGMENTED REALITY CONTENT BASED ON USER ENGAGEMENT

FIELD OF THE DISCLOSURE

The subject disclosure relates to methods, systems, and devices for providing augmented reality content based on user engagement.

BACKGROUND

Traditional television content can be broadcasted to a viewer's/user's communication device such as a television, media processor, mobile device, etc. by a television content provider. In some embodiments, the television provider can provide some augmented reality content generated from the television content to the user's communication device. Further, the user can have some interactions with such augmented reality content.

BRIEF DESCRIPTION OF THE DRAWINGS

Reference will now be made to the accompanying drawings, which are not necessarily drawn to scale, and wherein:

FIGS. 2A-2D are block diagrams illustrating example, non-limiting embodiments of systems functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
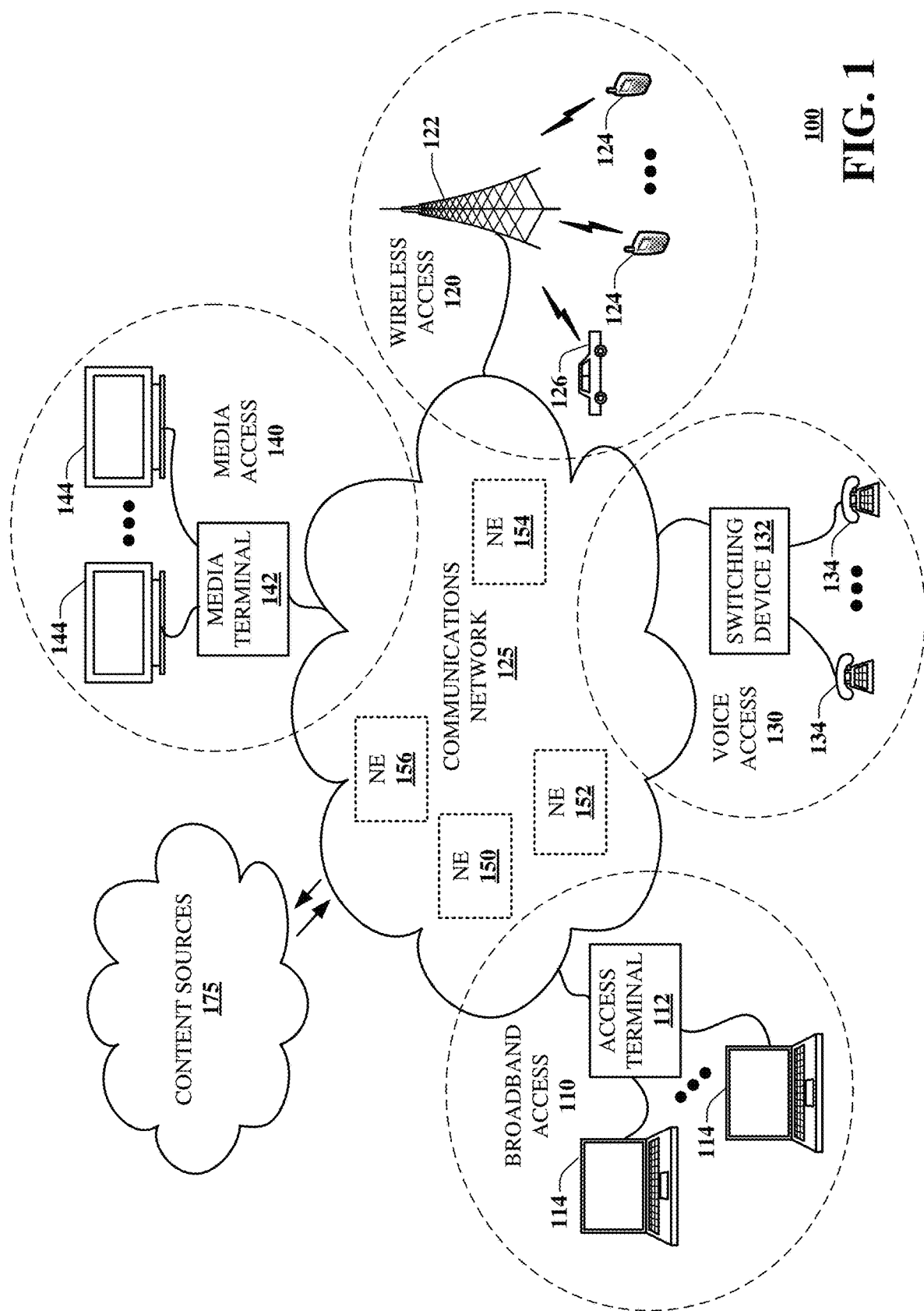
FIG. 1 is a block diagram illustrating an exemplary, non-limiting embodiment of a communications network in accordance with various aspects described herein.

The subject disclosure describes, among other things, illustrative embodiments for receiving video content over a communication network, and determining a point of interest in relation to a presentation of the video content via equipment utilized by a user. Further embodiments include identifying an object in the video content according to the point of interest, and obtaining information associated with the object. Additional embodiments can include generating first augmented reality content based on the video content and the information associated with the object, and providing the first augmented reality content to a communication device. The communication device presents the first augmented reality content. Other embodiments are described in the subject disclosure.

One or more aspects of the subject disclosure include a device, comprising a processing system including a processor, and a memory that stores executable instructions that, when executed by the processing system, facilitate performance of operations. The operations can include receiving video content over a communication network, and determining a point of interest in relation to a presentation of the video content via equipment utilized by a user. Further operations can include identifying an object in the video content according to the point of interest, and obtaining information associated with the object. Additional operations can include generating first augmented reality content based on the video content and the information associated with the object, and providing the first augmented reality content to a communication device. The communication device presents the first augmented reality content.

One or more aspects of the subject disclosure include a machine-readable medium, comprising executable instructions that, when executed by a processing system including a processor, facilitate performance of operations. The operations can include receiving video content over a communication network, and determining a point of interest in relation to a presentation of the video content via equipment utilized by a user. Further operations can include identifying an object in the video content according to the point of interest, and obtaining information associated with the object. Additional operations can include receiving user-generated input from a communication device. The user-generated input instructs the processing system to provide a first augmented reality content to a social media user, over a social media network. Also, operations can include generating the first augmented reality content based on the video content and the information associated with the object that includes an interactive chat to interact with the social media user. Further operations can include providing the first augmented reality content to the communication device. The communication device presents the first augmented reality content.

One or more aspects of the subject disclosure include a method. The method can comprise receiving, by a processing system including a processor, video content over a communication network, and determining, by the processing system, a point of interest in relation to a presentation of the video content via equipment utilized by a user. Further, the method can comprise identifying, by the processing system, an object in the video content according to the point of interest, and obtaining, by the processing system, information associated with the object. In addition, the method can comprise obtaining, by the processing system, a target advertisement, and generating, by the processing system, a first augmented reality content based on the video content, information associated with the object, and the target advertisement. Also, the method can comprise providing, by the processing system, the first augmented reality content to a communication device. The communication device presents the first augmented reality content.

Referring now to FIG. 1, a block diagram is shown illustrating an example, non-limiting embodiment of a communications network 100 in accordance with various aspects described herein. For example, communications network 100 can facilitate in whole or in part generating and provided augmented reality content based on user interaction with video content. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2D are block diagrams illustrating example, non-limiting embodiments of systems functioning within the communication network of FIG. 1 in accordance with various aspects described herein.

Referring to FIG. 2A, a system 215 can include a television/media processor 201, communication device 203, server 213 and communication network 217 all of which contribute to provide augmented reality content to the communication device 203 based on television content for viewing by a user. The communication device 203 can include a mobile phone, smartphone, tablet computer, laptop computer, smartwatch, wearable device, augmented reality device, or a desktop computer, or a combination thereof. The communication network 217 can comprise one or more wireless networks, one or more wired networks, or a combination thereof. In some embodiments, the functions of server 213 can be implemented by several servers communicatively coupled over one or more communication networks.

In one or more embodiments, augmented reality (AR) brings digital information and virtual objects into the physical world. Embodiments include enhanced features for users watching and engaging with physical television (TV) through AR devices, which traditionally treat users as passive observers. Further embodiments include enhanced TV watching features utilizing AR device's capabilities of scene capture, gaze tracking (i.e., point of interest tracking), a local computing resource, and Internet connectivity through mobile network(s) to improve overall user experience and boost engagement to turn TV audience from passive observers to much more interactive participants. Additional embodiments utilize AR devices' scene cameras to capture real-time TV content as input, eye tracker to identify user's gaze to interact with TV raw and enhanced content (focused objects or text), a local computing resource (e.g., GPUs) for content analysis and results rendering, 4G or 5G connection for web resources and off-loading heavy computing to servers on edge network(s), and a display for the enhanced visualization. Other embodiments include real-time TV content segment and gaze detection as well as object alignment. Some embodiments include updating content with live object content for augmentation for XR (i.e., Extended Reality that can include virtual reality (VR) and/or AR) and 2-D content. Further embodiments can include social sharing of XR object interaction.

In one or more embodiments, a server 213 (or communication device 203) can take a portion of TV content as indicated by the user gaze and interaction, and a specific object in the portion of TV content can be broken out using augmented reality to communication device 203 (e.g., user interactive device). That is, an object can have several internal objects that can be broken out and presented in the augmented reality content and interact with by a user. Further embodiments can include augmentation of on-screen content such as a highlighted object can be included on display, and augmented model of the object can be built or interacted with afterwards. Additional embodiments can include break-out of object 3-D model for local interaction in an educational utility.

In one or more embodiments that can deal with the user experience, a server 213 (or communication device 203) processing TV content can recognize and highlight a celebrity and fetch, over the communication network 217 across the Internet, news, biography information, or recent activity of the celebrity. This can include real-time recognition from the screen, expansion of data from the web, or user gaze that indicates a point of interest of the user to the character played by the celebrity. Further embodiments can allow rotation of character by user gesture for inspection of character clothing or viewing the character from a different viewpoint using the generated 3-D model and can be augmented by other web information. Further embodiments can include direct product purchasing from TV (not only through advertisements, but if user is interested, in a product in the TV content). This includes 3-D 360 degree surround review and inspection of object in-scene that includes finding object in 2-D scene or flattened volumetric video content. In addition, other assets could be added by possible interaction with other AR assets from knowledge base. Additional embodiments can include a social network to share news, movie, and provide comments that include annotations from AR interactions that can be shared for remote experience (e.g., classroom style). Some embodiments can include fine grained object level viewership for personalized recommendation and target advertisements that include having high-precision user gaze information informing of broadcast event of objects, possibly used as summary locations or trend/demographic specific highlights. Other embodiments can include a deeper dive in a news story by locating the event, finding related reports, making comments, or searching the web, etc. that include using content similarity to bring other views such as 360 degree views and map of location.

In one or more embodiments, a server 213 can take a sequential snapshots of TV content and generate a 3-D model of the TV content using 3-D reconstruction technologies. Although the static version of the TV content is available, a television provider (broadcaster) can provide and playback the 3-D model (e.g., video content of a baseball player swinging a bat that can be stock video content with a link to each object/player for more information regarding the object or player).

One or more embodiments can be directed to an education utility that allows users to inspect objects in more depth and detail. Further embodiments can include exploration of a new device (e.g., medical, instrument, etc.) and gathering of information. Additional embodiments can include interactive moments and movements that impact the display of one or more users. Some embodiments can include video synchronization of texture to an object such as live smartphone screen projected onto an XR object. Other embodiments can include an education utility in which a user (e.g., teacher or student) giving up control of object to another user (e.g., student), who maintains control. In such embodiments, a reset button triggered by the video content resets the 3-D object. Further embodiments can include texture mapping from live version onto the detected/matched model.

Figure 2B:
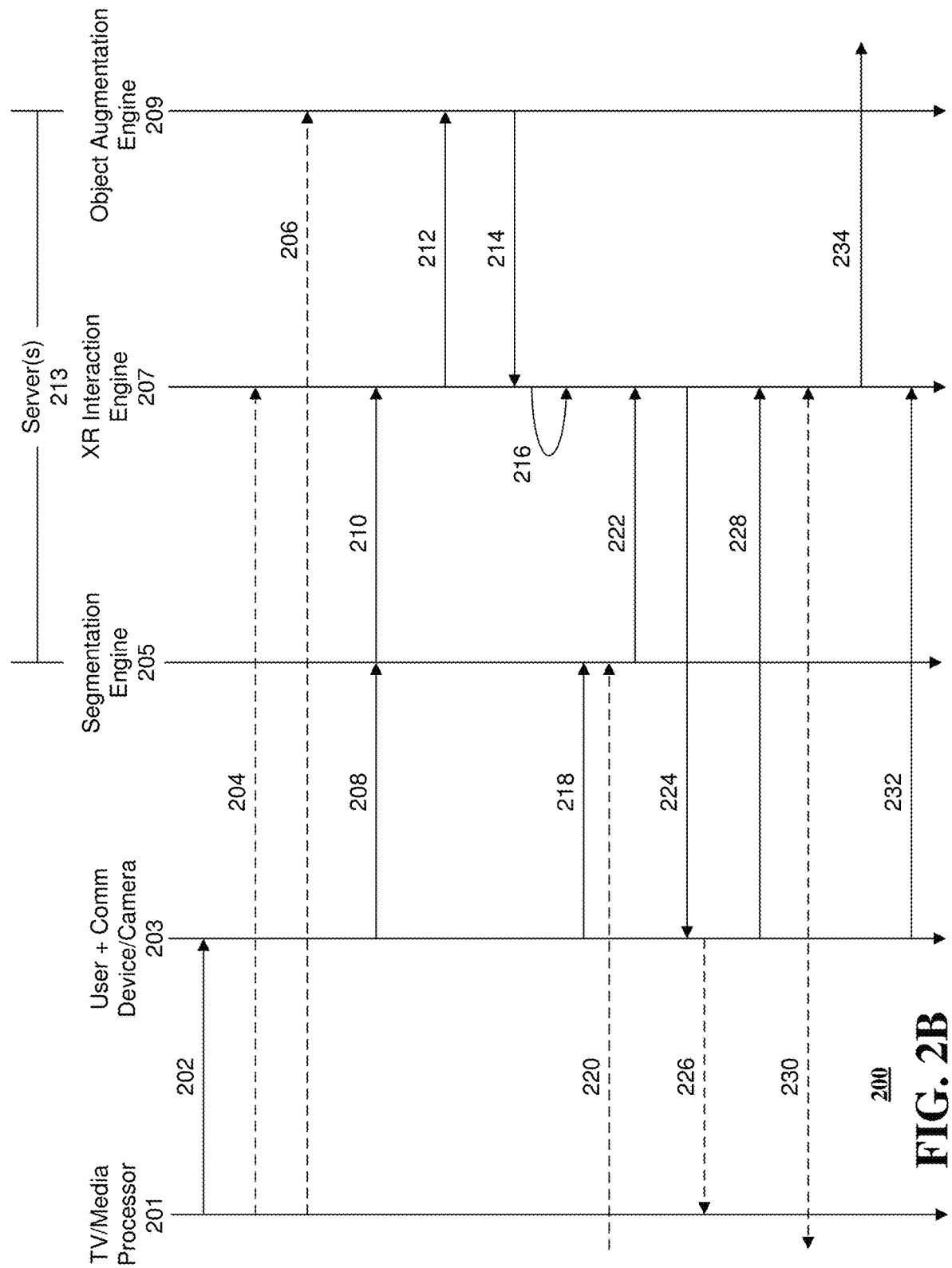

Referring to FIG. 2B, in one or more embodiments, the system 200 can include devices shown in FIG. 2A such as the server(s) 213, the television/media processor 201 (or some other display than a television) as well as a user's communication device 203 that has AR capability and has a camera such that the camera can be communicatively coupled to the communication device 203. Further, the system 200 can include a segmentation engine 205, XR interaction engine 207, and an object augmentation engine 209, all of which can be incorporated in one or more servers 213. However, in some embodiments the communication device 203 can comprise the segmentation engine 205. Each server can comprise a processing system including a processor. In addition, each server can be communicatively coupled to the television/media processor 201 and the user with communication device 203 having a camera by a one or more communication networks, which can be one or more wireless networks, wired networks, or a combination thereof. Also, the segmentation engine 205, XR interaction engine 207, and an object augmentation engine 209 can be software applications, each of which are implemented by server(s) 213.

In one or more embodiments of the system 200, video content (e.g., television content) can be displayed on TV 201 or on the communication device 203. A primary camera for AR experience in the communication device 203 can recognize TV content and segment a portion of the TV content from the background. Further embodiments can include recognizing and segmenting objects in a scene by identifying their pixel boundaries. Additional embodiments can include text mapping from live version of TV content onto the detected/matched model. Other embodiments can include currently viewed TV content can assist experience with metadata feed.

In one or more embodiments, the system 200 can determine user interest location for orientation or for an object. Further embodiments can include selecting specific objects in a scene by alignment with user viewing direction. Additional embodiments can include highlighting specific objects, if not all objects are available for inspection (e.g., a busy crowd or dense scene). Some embodiments can include detecting user gesture utilizing a gyro and other 3D/VR capture techniques (e.g., tab, selection, etc.). Other embodiments can include narrowing scope of an object to be augmented from known (via detection or historical account) most popular objects for a specific user or for an aggregate set of users (e.g., from a social perspective). Also, embodiments can include a secondary camera for user gaze determination that is included in either the TV/media processor 201 or the communication device 203.

In one or more embodiments, the screen of TV 201 or communication device 203 can react by modifying object with respect to available inspection targets (e.g., highlights). Further embodiments can include the highlighted portion of the video content can be enlarged by user selection. Further embodiments can include all objects to be shown as broken-out for selection. That is an augmented object can be shown to have several internal or external parts, each of which the augmented reality shows as another object that can be manipulated or inspected by the user.

In one or more embodiments, a user can select and interact with an object. Further embodiments can include object recognition using metadata or image/video recognition to link external data. Additional embodiments can include a user providing user-generated input to rotate or otherwise interact with an object as it is real-time synchronized from screen feed/content. Additional embodiments can include interactions that can be shared with social media connections or for education reuse (student/instructor). Some embodiments can include propagating shared object interactions. Other embodiments can include the video content or other users triggering canonical orientation reset or highlights that is provided among many users.

In one or more embodiments, history of objects can be retained for possible purchase or subsequent review and/or sharing. Further embodiments can include a user purchasing a 3-D model, physical object, or can be locally printed/recreated. Additional embodiments can include a user reusing linked 3-D model in a mashup of other content (e.g. famous scoring move against robots).

In one or more embodiments, AR recognition of object initially performed (e.g. avatar, building, car) can be enhanced by changing the texture or appearance of the object (e.g., detected gun or costume). These texture changes can include downloading additional costumes for interaction (e.g., gun structure for enemies, friends, roles). Additional embodiments may include different poses or activity sequences for the object (e.g. dribbling a basketball, shooting a basketball, or performing a touchdown dance) that may or may not have been seen in the original 2D video content. In other embodiments, the texture or appearance of the object may be customized according to some user preferences (e.g. replacing a team jersey or modifying to match a car mode that was recently purchased or discussed by the user).

In one or more embodiments, detail from 2-D video content can be insufficient (e.g. pixel detail). Further embodiments can augment with external 3-D details. That is, a relaxed/default texture can be included with the 3-D model but would only be updated with what was available from 2-D video content. (e.g., high resolution from 3-D source, low resolution 2-D update). Additional embodiments can include television content being varied by inputs (e.g., from interactions or from video content consumption, such as Netflix).

In one or more embodiments, an education utility can be provided each of which can include nested objects that can be explored by users (e.g., students). For example, if video content is paused and initial object was in the user's point of interest then user can utilize XR to explore internal nested objects of the initial object. Further embodiments can include retrieval of the internal nested objects of the initial object as part of the augmentation. In one example, a user may first retrieve a car object that was seen on screen. Using XR to explore, the details of the dash, seating, and drivers compartment may be additionally retrieve and enhanced by the augmentation engine 209 such that high-quality details of these inner components are added where previously there were none. Additional embodiments can include visuals being texture mapped from 2-D video content (what users are watching) when appropriate. For example, if using XR to explore a new model of a television or computer as the primary object, the screen of that XR object will be synchronized to what is on-screen in the 2-D video content. Some embodiments can include interactions that are shared through normal mechanism for social/educational review.

In one or more embodiments, snapshots of the 2-D video content can be captured and used for 3-D animation. Further embodiments can include a 3-D model created of a favorite hero in an action movie, and save it in personal repository, which can then be combined with other models from different movies and have them re-enact and fight together in new user-driven environments.

In one or more embodiments, additional augmentation of 2-D video content/TV screen from user interactions can be provided. Further embodiments can include face swap, product injection, etc., but using the manipulated object from user interactions.

In one or more embodiments, personal preferences for 2-D or 3-D object are projected (e.g. preferred topology and textual for an object component).

One or more embodiments can include an ability to detect an object in a scene and grab them for interaction in XR environment. Further embodiments can include loading external 2-D object data (other by visual recognition or metadata link) and update with content from live 2-D screen (e.g. project smartphone screen from commercial onto XR object that was pre-loaded from cloud). Additional embodiments can include sharing synchronizing of interactions with a 3-D object (specifically linked to 2-D content) among multiple individuals for entertainment or education usage.

In one or more embodiments, a system 200 can implement a series of steps 202-236 by a TV/media processor 201, communication device 203, and server(s) 213 to provide interactive augmented reality content based on television content to the user to be viewed using the communication device 203. Further, at a step 202, the television/media processor 201 can provide playback video content to the communication device 203. The playback video content can be television content that was previously recorded, live, or time-delayed. Further, at steps 204 and 206, the television/media processor 201 can provide optional pre-segmented objects to the communication device 203 as part of the augmented reality content based on the television content to the XR interaction engine 207 and object augmentation engine, respectively. In addition, at step 208, the communication device 203 can implement video feed capture from the segmentation engine 205. Also, at step 210, the segmentation engine 205 can segment the objects in the video feed and provide them to the XR interaction engine 207. Further, at step 212, the XR interaction engine 207 can download additional data from an information repository or from across the Internet/web and provide the additional data to the object augmentation engine 209. At step 214, the object augmentation engine can generate augmented reality content that can include 3-D object generation (or approximate matching—e.g., generic car model) and provide the 3-D objects to the XR interaction engine 207. Further, at step 216, the XR interaction engine 207 can generate and deliver live texture maps to the 3-D objects and other aspects of the augmented reality content.

In one or more embodiments, at step 218, the communication device 203 can detect gaze/point of interest, user gesture, interaction, or other user-generated input for an object within the television content and provide such gaze/point of interest, user gesture, interaction, or other user-generated input to the segmentation engine 205. At step 220, the television/media processor 201 can provide a selection of popular, sponsored, or socially trending objects within the television content to the segmentation engine 205. Further, at step 222, the segmentation engine 205 detects the selected objects and provides (or provides an indication of) the selected objects to the XR interaction engine 207. In addition, at step 224, the XR interaction engine 207 generates the selected objects as part of the augmented reality content and provides them to the communication device 203. Also, at step 226, the communication device can provide information to the television/media processor to highlight, or otherwise mark, selected objects. At step 228, the communication device can provide user-generated input such as rotation of an object, click-through of a target advertisement, open an object (which may have internal objects), and social media interactions to the XR interaction engine 207. Further, at step 230, the XR interaction engine can provide the social media interactions with other social media users over a social media network, share other user interactions externally, synchronize user interactions across user instance as supported by high-bandwidth, low-latency 5G networks. In addition, at step 232, the communication device 203 can provide to the XR interaction engine 207 user-generated input that indicates a purchase of 3-D model for viewing augmented reality content and/or click-through for purchase/e-commerce. Also, at step 234, the XR interaction engine 207 can archive user interactions with the augmented reality content and the objects into a personal profile for the user in a database or other information repository for future use.

Referring to FIG. 2C, in one or more embodiments, a communication device such as an AR device, which can be communicatively coupled to a mobile device, can present augmented reality content 235. Further the augmented reality content can comprise a live or time-delayed presentation of a basketball game 231, information 246 regarding one of the basketball players 242, and a social media chat 248 to interact with other social media users. In some embodiments, a social media chat may be presented as a window with instant textual messages between one or more individuals. In other embodiments, the social media chat may include emoticons and coupled audio (e.g. spoken or other audible sounds) conversations of one or more individuals. In still other embodiments, the social media chat may include visual avatars and real or approximated faces of one or more individuals that are communicating.

In one or more embodiments, the basketball game 231 of the augmented reality content 235 can comprise basketball players 233, 242, 238 on one team and basketball players 236, 243, and 240 on another team. Further, the communication device can detect that the point of interest of the user of the communication device is directed toward player 242 because it seems that the player 242 is about to score a basket. Thus, a server can highlight or otherwise mark 244 the image of player 242 as an object in the augmented reality content 235. In some embodiments, a server can highlight or otherwise mark 244 player 242 in response to determining other viewers/users of the basketball game 231 are directing their point of interest to player 242.

In one or more embodiments, in response to detecting the user's point of interest directed to player 242 or in response to highlighting or otherwise marking player 242, the server can provide the communication device with information 246 with regard to the player 242 and present the information 246 as part of the augmented reality content 235. In some embodiments, the information can be statistics regarding the player 242.

In one or more embodiments, the social media chat 248 can include social media content 239 such as social media comments and/or social media instant messages between a group of social media users. Further, the social media chat 248 can include a target advertisement 241. In other embodiments, the target advertisement can be presented in other parts of the augmented reality content 235. In further embodiments, the target advertisement can be overlaid onto the parts of the augmented reality content or displayed as a banner advertisement. In some embodiments, the target advertisement can be associated with the subject matter of the video content (e.g., basketball game 231) or associated with the object (e.g., player 242).

Figure 2D:
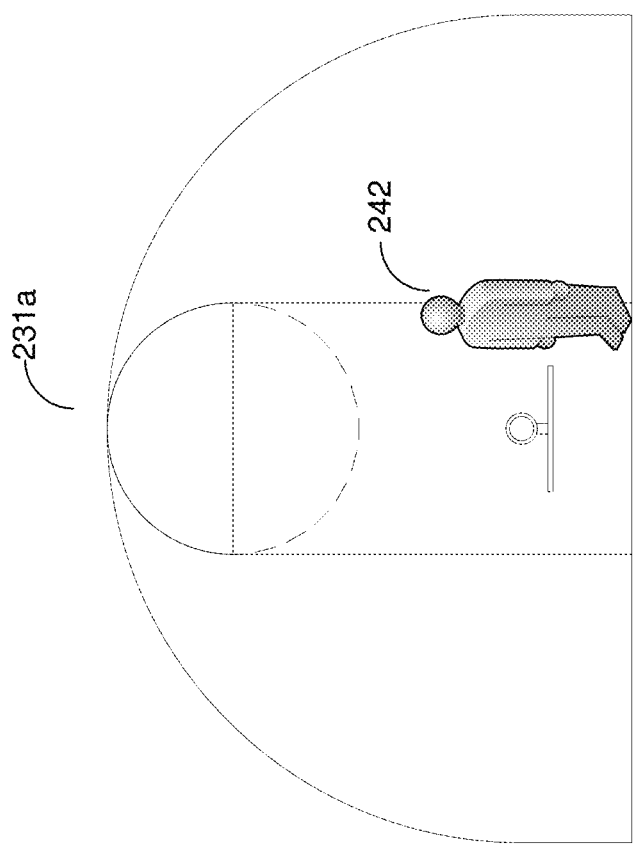

Referring to FIG. 2D, the communication device can receive user-generated input that indicates to rotate an object such as a player 242 to view the player 242 from a different angle. The communication device can provide such user-generated input to a server to generate augmented reality content 235*a* and provide such augmented reality content 235*a* to the communication device to present to the user. The augmented reality content 235*a* can include a different view of the basketball game 231*a* and player 242. Further, the augmented reality content 235*a* can include a social media chat 248 that comprises social media content 239*a* and a target advertisement 241*a*.

Figure 2E:
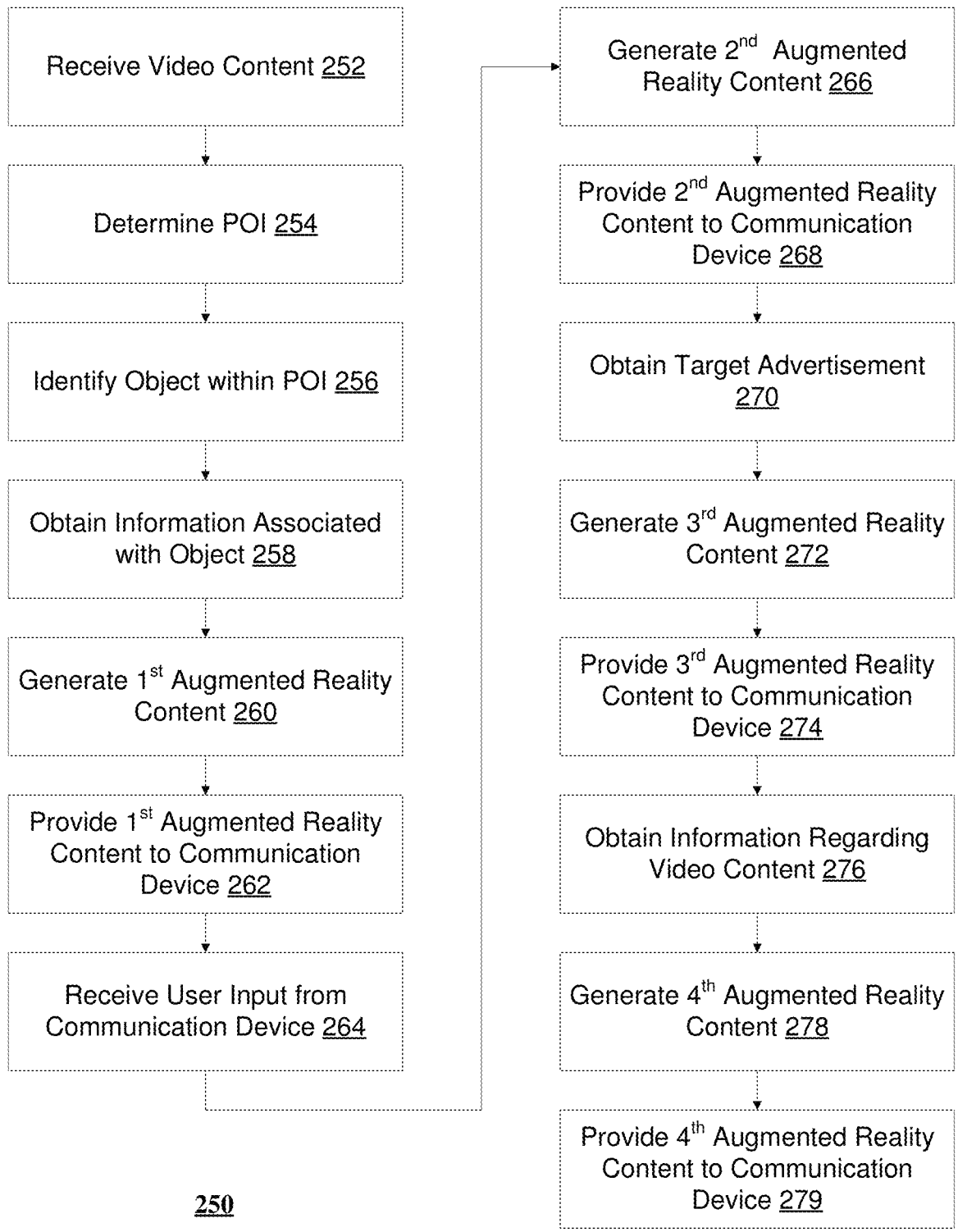
FIG. 2E depicts an illustrative embodiment of a method in accordance with various aspects described herein.

FIG. 2E depicts an illustrative embodiment of a method in accordance with various aspects described herein. In one or more embodiments, the method 250 can be implemented by one or more servers (or in part by a communication device described herein). Further, the method 250 can include the server, at 252, receiving video content over a communication network. In addition, the method 250 can include the server, at 254, determining a point of interest of a user for the video content. Also, the method 250 can include the server, at 256, identifying an object within the point of interest. Further, the method 250 can include the server, at 258, obtaining information associated with the object. In addition, the method 250 can include the server, at 260, generating first augmented reality content based on the video content and the information associated with the object. Also, the method 250 can include the server, at 262, providing the first augmented reality content to a communication device. The communication device presents the first augmented reality content.

In one or more embodiments, the method 250 can include the server, at 264, receiving user-generated input from the communication device. Further, the method 250 can include the server, at 266, generating second augmented reality content based on the user-generated input. In addition, the method 250 can include the server, at 268, providing the second augmented reality content to a communication device. The communication device presents the second augmented reality content. In some embodiments, the user-generated input indicates to provide the second augmented reality content to a social media user, over a social media network. Further, the generating of second augmented reality content can include an interactive chat to interact with the social media user. In other embodiments, the user-generated input can indicate to rotate the object. In addition, the generating of the second augmented reality content comprises rotating the object according to the user-generated input.

In one or more embodiments, the method 250 can include the server, at 270, obtaining a target advertisement. Further, the method 250 can include the server, at 272, generating a third augmented reality content based on the target advertisement. In addition, the method 250 can include the server, at 274, providing the third augmented reality content to a communication device. The communication device presents the third augmented reality content. In some embodiments, the target advertisement is associated with either the video content or the object. In other embodiments, the generating of the third augmented reality content comprises overlaying of the target advertisement on video content. In further embodiments, the generating of the third augmented reality content comprises presenting the target advertisement as a banner advertisement.

In one or more embodiments, the method 250 can include the server, at 276, obtaining information associated with the video content. Further, the method 250 can include the server, at 278, generating a fourth augmented reality content based on the information associated with the video content. In addition, the method 250 can include the server, at 279, providing the fourth augmented reality content to a communication device. The communication device presents the fourth augmented reality content.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Portions of embodiments described herein can be combined with portions of other embodiments described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems, and methods presented in FIGS. 1, 2A-E, and 3. For example, virtualized communication network 300 can facilitate in whole or in part generating and provided augmented reality content based on user interaction with video content.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
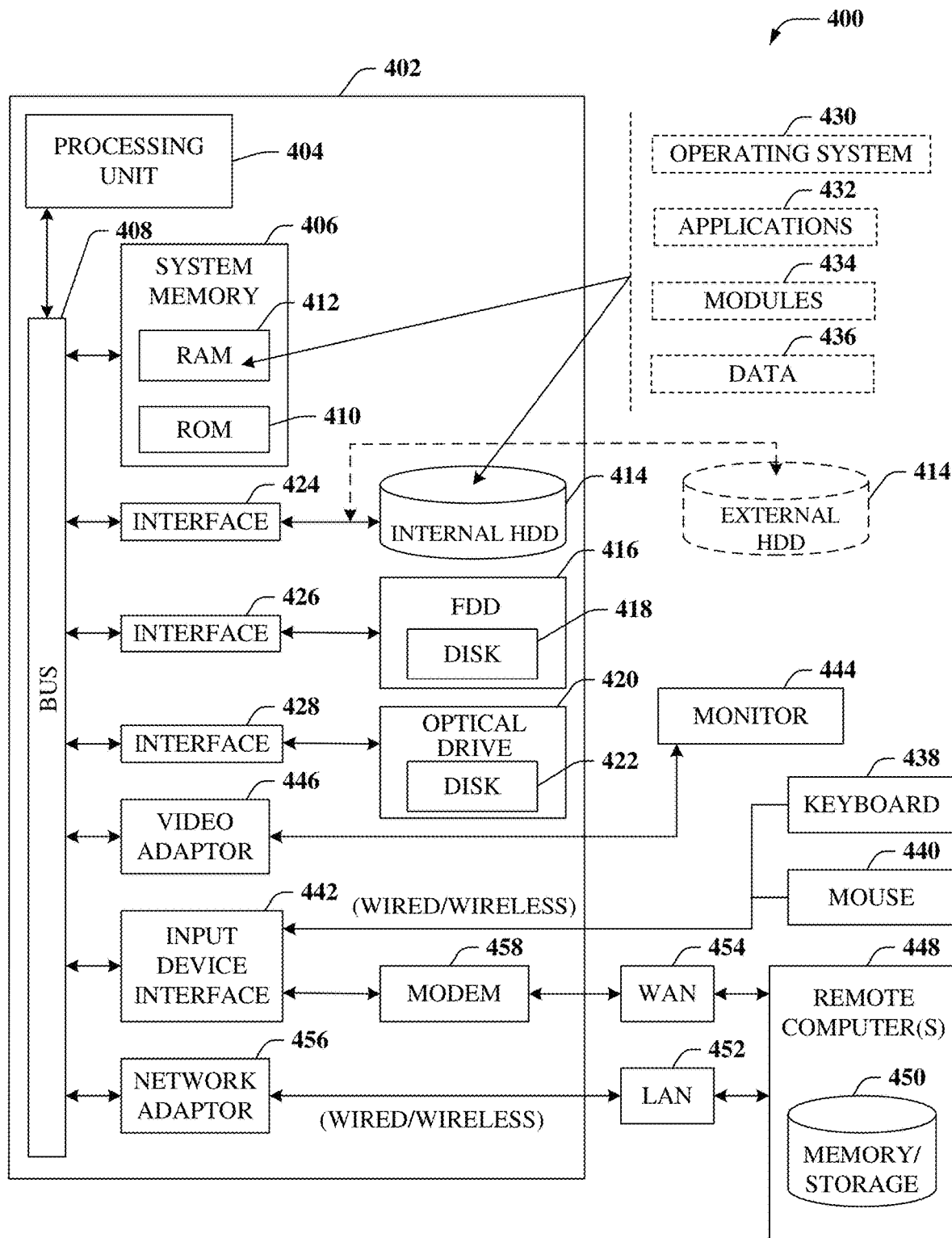
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part generating and provided augmented reality content based on user interaction with video content. Further, servers, and communication devices discussed in describing FIGS. 2A-2D comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
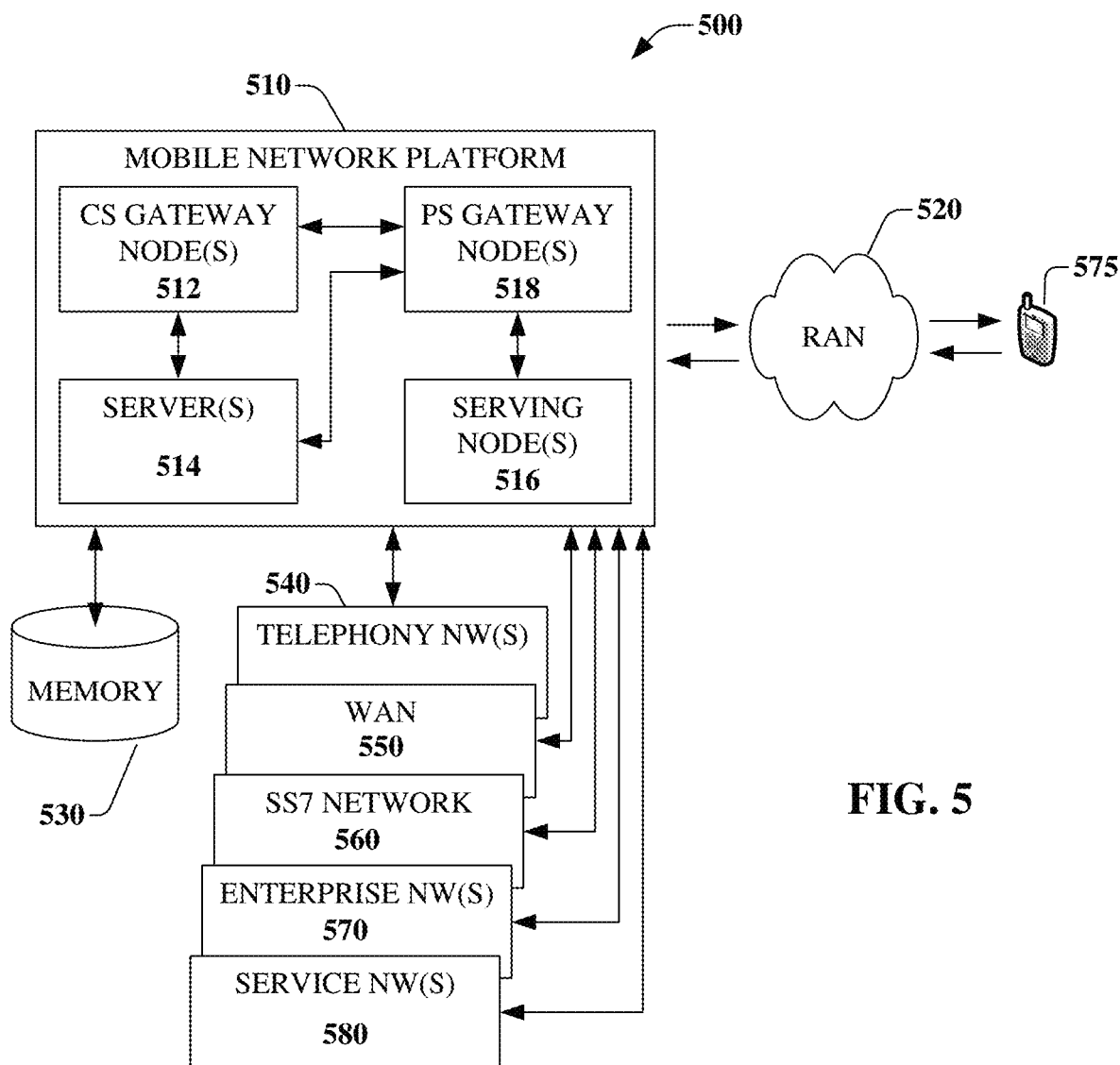
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating and provided augmented reality content based on user interaction with video content. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
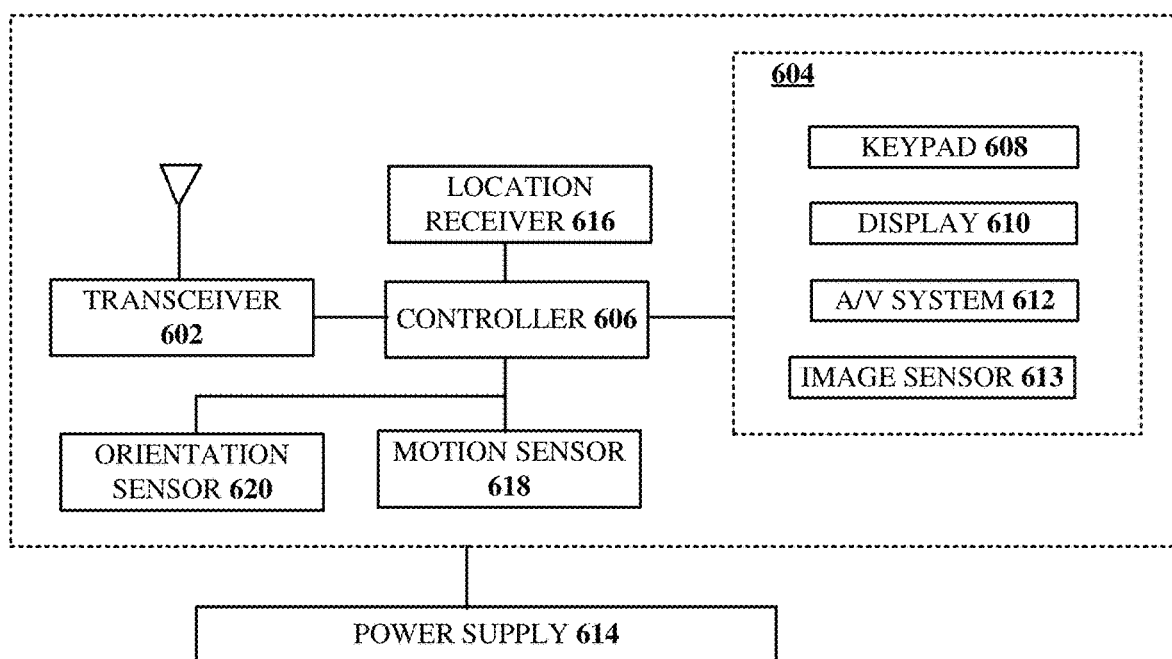
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generating and provided augmented reality content based on user interaction with video content. Further, servers, and communication devices discussed in describing FIGS. 2A-2D comprise computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
detecting user gaze in viewing a presentation of video content through a display screen of an augmented reality communication device associated with the user, wherein a media processor obtains the video content over a communication network, wherein the media processor presents the video content on a display device, wherein display device is separate from the display screen, wherein detection of the user gaze is based in part on data obtained from a detection device at one of the display device, display screen or media processor;
determining a point of interest in relation to the presentation of the video content via the augmented reality communication device utilized by the user according to the user gaze;
identifying an object in the video content according to the point of interest, wherein the object is highlighted and shown within the video content from a first perspective;

obtaining first information associated with the object;
generating first augmented reality content based on the video content, the object, and the first information associated with the object;
providing the first augmented reality content to the augmented reality communication device, wherein the augmented reality communication device presents the first augmented reality content simultaneously with the video content presented on the display device;
receiving first user-generated input from the augmented reality communication device, wherein the first user-generated input includes a first request to change in perspective of viewing the object and a second request for a social media chat window;
generating second augmented reality content based on the first request to the change in perspective of viewing the object, wherein the second augmented reality content presents the object from a second perspective and the social media chat window, wherein the social media chat window comprises a first target advertisement associated with the object and
providing the second augmented reality content to the augmented reality communication device, wherein the second augmented reality content is presented simultaneously with the first augmented reality content by the augmented reality communication device.

2. The device of claim 1, wherein the operations comprise: receiving second user-generated input from the augmented reality communication device that instructs the device to provide third augmented reality content to equipment of a social media user, over a social media network.

3. The device of claim 2, wherein the third augmented reality content comprises the social media chat window to enable interaction with the social media user via the equipment of the social media user.

4. The device of claim 2, wherein the first user-generated input instructs the device to rotate the object, wherein the generating of the second augmented reality content comprises rotating the object according to the first user-generated input.

5. The device of claim 2, wherein the first user-generated input instructs the device to adjust parts of the object, wherein the generating of the second augmented reality content comprises adjusting the object according to the first user-generated input, wherein the adjusting of the object includes at least one of exploring, opening, or expanding the object.

6. The device of claim 1, wherein the operations further comprise:
obtaining a second target advertisement;
generating a fourth augmented reality content based on the second target advertisement; and
providing the fourth augmented reality content to the augmented reality communication device, wherein the augmented reality communication device presents the fourth augmented reality content simultaneously with the first augmented reality content and the second augmented reality content.

7. The device of claim 1, wherein the display device comprises a television display.

8. The device of claim 6, wherein the fourth augmented reality content comprises a banner advertisement descriptive of the second target advertisement.

9. The device of claim 1, wherein the operations further comprise:
obtaining second information associated with the video content;
generating a fifth augmented reality content based on the second information associated with the video content; and
providing the fifth augmented reality content to the augmented reality communication device, wherein the augmented reality communication device presents the fifth augmented reality content simultaneously with the video content.

10. A non-transitory, machine-readable medium, comprising executable instructions that, when executed by a processing system including a processor, facilitate performance of operations, the operations comprising:
detecting user gaze in viewing a presentation of video content through a display screen of an augmented reality communication device associated with the user, wherein a media processor obtains the video content over a communication network, wherein the media processor presents the video content on a display device, wherein the display device is separate from the display screen, wherein the detection of the user gaze is based in part on data obtained from a detection device at one of the display device, display screen, or media processor;
determining a point of interest in relation to the presentation of the video content via the augmented reality communication device utilized by the user according to the user gaze;
identifying an object in the video content according to the point of interest, wherein the object is highlighted and shown within the video content from a first perspective;
obtaining first information associated with the object;
receiving first user-generated input from the augmented reality communication device, wherein the first user-generated input instructs the processing system to provide a first augmented reality content to equipment associated with a social media user, over a social media network;
generating the first augmented reality content based on the video content, the object, and the first information associated with the object that includes a social media chat window to interact with the social media user;
providing the first augmented reality content to the equipment associated with the social media user, wherein the equipment associated with the social media user presents the first augmented reality content simultaneously with the video content presented on the display device;
receiving second user-generated input from the augmented reality communication device, wherein the second user-generated input includes a first request to change in perspective of viewing object and a second request for the social media chat window;
generating second augmented reality content based on the first request to the change in perspective of viewing the object, wherein the second augmented reality content presents the object from a second perspective and the social media chat window, wherein the social media chat window comprises a first target advertisement associated with the object; and
providing the second augmented reality content to the augmented reality communication device, wherein the second augmented reality content is presented simultaneously with the first augmented reality content by the augmented reality communication device.

11. The non-transitory, machine-readable medium of claim 10, wherein the second user-generated input instructs the device to rotate the object, wherein the generating of the first augmented reality content comprises rotating the object according to the second user-generated input.

12. The non-transitory, machine-readable medium of claim 10, wherein the operations further comprise:
   obtaining a second target advertisement;
   generating a third augmented reality content based on the second target advertisement; and
   providing the third augmented reality content to the augmented reality communication device, wherein the augmented reality communication device presents the third augmented reality content.

13. The non-transitory, machine-readable medium of claim 12, wherein the second target advertisement is associated with the video content or the object.

14. The non-transitory, machine-readable medium of claim 12, wherein the third augmented reality content comprises an overlay of the second target advertisement on the video content.

15. The non-transitory, machine-readable medium of claim 12, wherein the third augmented reality content comprises a banner advertisement descriptive of the second target advertisement.

16. The non-transitory, machine-readable medium of claim 10, wherein the operations further comprise:
   obtaining second information associated with the video content;
   generating a fourth augmented reality content based on the second information associated with the video content; and
   providing the fourth augmented reality content to the augmented reality communication device, wherein the augmented reality communication device presents the fourth augmented reality content.

17. A method, comprising:
   detecting by a processing system including a processor, user gaze in viewing a presentation of video content through a display screen of an augmented reality communication device associated with the user, wherein a media processor obtains the video content over a communication network, wherein the media processor presents the video content on a display device, wherein the display device is separate from the display screen, wherein the detection of the user gaze is based in part on data obtained from a detection device at one of the display device, display screen or media processor;
   determining, by the processing system, a point of interest in relation to the presentation of the video content via the augmented reality communication device utilized by the user according to the user gaze;
   identifying, by the processing system, an object in the video content according to the point of interest, wherein the object is highlighted shown within the video content from a first perspective;
   obtaining, by the processing system, information associated with the object;
   obtaining, by the processing system, a first target advertisement;
   generating, by the processing system, a first augmented reality content based on the video content, the object, the information associated with the object, and the first target advertisement;
   providing, by the processing system, the first augmented reality content to the augmented reality communication device, wherein the augmented reality communication device presents the first augmented reality content simultaneously with the video content presented on the display device;
   receiving, by the processing system, user-generated input from the augmented reality communication device, wherein the user-generated input includes a first request to change in perspective of viewing the object and a second request for a social media chat window;
   generating second augmented reality content based on the first request to the change in perspective of viewing the object, wherein the second augmented reality content presents the object from a second perspective and the social media chat window, wherein the social media chat window comprises a second target advertisement associated with the object; and
   providing the second augmented reality content to the augmented reality communication device, wherein the second augmented reality content is presented simultaneously with the first augmented reality content by the augmented reality communication device.

18. The method of claim 17, wherein the first target advertisement is associated with the video content or the object.

19. The method of claim 17, wherein the first augmented reality content comprises an overlay of the first target advertisement on the video content.

20. The method of claim 17, wherein the first augmented reality content comprises a banner advertisement descriptive of the first target advertisement.

* * * * *